(12) United States Patent
Jin et al.

(10) Patent No.: US 12,254,999 B2
(45) Date of Patent: Mar. 18, 2025

(54) NOBLE GAS SOLID-STATE SINGLE ELECTRON QUBIT PLATFORM

(71) Applicants: UCHICAGO ARGONNE, LLC, Chicago, IL (US); THE UNIVERSITY OF CHICAGO, Chicago, IL (US)

(72) Inventors: Dafei Jin, Chicago, IL (US); Xianjing Zhou, Westmont, IL (US); Gerwin Koolstra, Chicago, IL (US); Ge Yang, Chicago, IL (US); David I. Schuster, Chicago, IL (US)

(73) Assignees: UCHICAGO ARGONNE, LLC, Chicago, IL (US); THE UNIVERSITY OF CHICAGO, Chicago, IL (US)

( * ) Notice: Subject to any disclaimer, the term of this patent is extended or adjusted under 35 U.S.C. 154(b) by 611 days.

(21) Appl. No.: 17/672,389

(22) Filed: Feb. 15, 2022

(65) Prior Publication Data
US 2024/0304353 A1     Sep. 12, 2024

(51) Int. Cl.
*G06N 10/40*   (2022.01)
*B82Y 10/00*   (2011.01)
*G21K 1/00*    (2006.01)
*G21K 1/087*   (2006.01)

(52) U.S. Cl.
CPC ............ *G21K 1/003* (2013.01); *B82Y 10/00* (2013.01); *G06N 10/40* (2022.01); *G21K 1/087* (2013.01)

(58) Field of Classification Search
CPC ........ G21K 1/003; G21K 1/087; G06N 10/00; G06N 10/40; B82Y 10/00
See application file for complete search history.

(56) References Cited

U.S. PATENT DOCUMENTS 10,892,398 B2   1/2021   Pollanen et al.
2008/0086438 A1  4/2008  Amin et al.

OTHER PUBLICATIONS

Abdurakhimov et al., Strong Coupling of the Cyclotron Motion of Surface Electrons on Liquid Helium to a Microwave Cavity, Physical Review Letters, 117:056803 (2016).
Asfaw et al., Transport Measurements of Surface Electrons in 200-nm-Deep Helium-Filled Microchannels Above Amorphous Metallic Electrodes, Journal of Low Temperature Physics, 195:300-6 (2019).
Bradbury et al., Efficient Clocked Electron Transfer on Superfluid Helium, Physical Review Letters, 107:266803 (2011).

(Continued)

*Primary Examiner* — Sean M Luck
(74) *Attorney, Agent, or Firm* — MARSHALL, GERSTEIN & BORUN LLP

(57) ABSTRACT

Qubit devices require fast operation, long coherence, and large scalability to be viable for implementation in quantum computing systems. A qubit platform device having long coherence, scalability, and fast operation includes a substrate, or trap region, configured to structurally support solid neon thereon. A trap electrode is configured to provide a trap voltage to the trap region and which creates a confining electrical field to a confining region adjacent to the trap region. The confining region being a region of space to confine an electron therein, confining the electron against the solid neon. First and second sets of guard electrodes are configured to provide variable electric potentials to first and second guard regions to allow for trapping and manipulation of a single electron in the confining region.

18 Claims, 8 Drawing Sheets

(56) References Cited

OTHER PUBLICATIONS

Bradbury et al., Extremely efficient clocked electron transfer on superfluid helium, retrieved from the Internet at: https://arxiv.org/ftp/arxiv/papers/1107/1107.4040.pdf>(submitted Jul. 20, 2011).
Byeon et al., Piezoacoustics for precision control of electrons floating on helium, Nat. Commun., 12:4150 (2021).
Chepelianskii et al., An incompressible state of a photo-excited electron gas, Nat. Commun., 6:7210 (2015).
Cole et al., Image-potential-induced surface bands in insulators, Phys. Rev. Lett., 23:1238 (1969).
Cole, Electronic surface states of liquid helium, Rev. Mod. Phys., 46:451 (1974).
Dahm et al., Using Electrons on Liquid Helium for Quantum Computing, J. Low Temp. Phys., 126:709-18 (2002).
De Leon et al., Materials challenges and opportunities for quantum computing hardware, Science, 372(6539):eabb2823 (Apr. 16, 2021).
Dykman et al., Ripplonic Lamb Shift for Electrons on Liquid Helium, Physical Review Letters, 119:256802 (2017).
Grimes et al., Evidence for a Liquid-to-Crystal Phase Transition in a Classical, Two-Dimensional Sheet of Electrons, Phys. Rev. Lett., 42:795 (1979).
International Search Report and Written Opinion for International Application No. PCT/US2020/023001, dated Jul. 29, 2020.
Kajita, A new two-dimensional electron system on the surface of solid neon, Surface Sci., 142(1-3):86-95 (1984).
Kajita, Wigner Crystallization of Two Dimensional Electrons Formed on the Surface of Solid Neon, J. Physics Society Japan, 54(11):4092-5 (1985).
Kawakami et al., Image-Charge Detection of the Rydberg States of Surface Electrons on Liquid Helium, Physical Review Letters, 123:086801 (2019).
Kawakami et al., Relaxation of the Excited Rydberg States of Surface Electrons on Liquid Helium, Physical Review Letters, 126:106802 (2021).
Kono et al., Surface state electrons on a hydrogen film. 2. Influence of adsorbed helium films, Journal of Low Temperature Physics, 85:423-44 (1991).
Kono et al., Surface-state electrons on a hydrogen film. 1. Annealing of the film, Journal of Low Temperature Physics, 82:279-93 (1991).
Konstantinov et al., Novel Radiation-Induced Magnetoresistance Oscillations in a Nondegenerate Two-Dimensional Electron System on Liquid Helium, Physical Review Letters, 103:266808 (2009).
Koolstra et al., Coupling a single electron on superfluid helium to a superconducting resonator, Nat. Commun., 10:5323 (2019).
Leiderer, Electrons at the surface of quantum systems, Journal of Low Temperature Physics, 87:247-78 (1992).
Lyon, Spin-based quantum computing using electrons on liquid helium, Physical Review A, 74:052338 (2006).
Majer et al., Coupling superconducting qubits via a cavity bus, Nature, 449:443-7 (2007).
Moskovtsev et al., Mobility of a spatially modulated electron liquid on the helium surface, Physical Review B, 101:245435 (2020).
Papageorgiou et al., Counting Individual Trapped Electrons on Liquid Helium, Applied Physics Letters, 86:153106 (2005).
Platzman et al., Quantum computing with electrons floating on liquid helium, Science, 284(5422):1967-9 (Jun. 1999).
Popkin, Quest for qubits, Science, 354(6316):1090-3 (Dec. 2016).
Rees et al., Stick-Slip Motion of the Wigner Solid on Liquid Helium, Physical Review Letters, 116:206801 (2016).
Rousseau et al., Addition spectra of Wigner islands of electrons on superfluid helium, Physical Review B, 79:045406 (2009).
Schuster et al., Proposal for Manipulating and Detecting Spin and Orbital States of Trapped Electrons on Helium Using Cavity Quantum Electrodynamics, Physical Review Letters, 105:040503 (2010).
Sheludiakov et al., Electrons Trapped in Solid Neon-Hydrogen Mixtures Below 1K, Journal of Low Temperature Physics, 195:365-77 (2019).
Smolyaninov, Electronics on solid hydrogen and solid neon surfaces, Int. J. Mod. Phys. B, 15:2075-106 (2001).
Sommer et al., Mobility of electrons on the surface of liquid 4He, Phys. Rev. Lett., 27:1345 (1971).
Yang et al., Coupling an Ensemble of Electrons on Superfluid Helium to a Superconducting Circuit, Physical Review X, 6:011031 (2016).
Yunusova et al., Coupling between Rydberg States and Landau Levels of Electrons Trapped on Liquid Helium, Physical Review Letters, 122:176802 (2019).
Zhou et al., Single electrons on solid neon as a solid-state qubit platform, arXiv:2106.10326 (submitted Jun. 18, 2021).
Zimmerman et al., Study of the electron spin resonance of negative ions field emitted into liquid helium, Phys. Rev. B, 15:2630 (1977).

NOBLE GAS SOLID-STATE SINGLE ELECTRON QUBIT PLATFORM

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE DISCLOSURE

The present disclosure relates to methods and systems for generating and manipulating a qubit, and specifically to generation and operation of a noble gas solid-state qubit device.

BACKGROUND

Quantum computing is an emerging computational technology that utilizes the properties and phenomena of quantum states to perform information processing. While traditional computers use bits for performing functions and storing information, quantum computers use phenomena such as superposition, interference, and entanglement of quantum bits (qubits) for storing and processing information. Quantum computers provide the promise for performing computational processes much faster than traditional computers. Further, quantum computers may be able to solve computational problems that current computer systems are incapable of solving.

Computing systems require that bits and memory are able to retain information for times long enough to retrieve or manipulate the information to perform functions. The amount of time that a qubit retains information or exhibits useful quantum state properties is called the coherence time. Due to the nature of quantum systems and qubits, most current qubit devices have very short coherence times, which limits the usefulness of such qubits for the realization of a quantum computing system. Further, it is desirable that qubits perform at very high speeds such that the qubit may be used multiple times during the coherence time of the qubit.

Another challenge of creating a quantum computer is scalability. Current semiconductor based computing systems have millions of transistors on a single chip for performing operations and storing information. Many existing qubit devices require bulky setups which limits scalability of qubit systems to including only a few qubits.

Quantum computing may be useful for nearly any field of endeavor, from medical devices, research simulations, data processing, astronomy, design of pharmaceuticals, defense systems, secure communications, etc. Due to the broad applicability of quantum computing, there is great need for a robust scalable qubit device with long coherence times.

SUMMARY OF THE DISCLOSURE

In an embodiment, disclosed is a device having a substrate configured to structurally support solid neon disposed thereon. Typically, the substrate may be one of silicon, sapphire, or another low-loss solid. A trap electrode is disposed adjacent to the substrate and configured to provide a confining electrical field to a confining region adjacent to the substrate. A first set of guard electrodes are configured to provide a variable electric potential to a first guard region adjacent to the confining region on one side of the confining region, and a second set of guard electrodes are configured to provide a variable electric potential to a second guard region adjacent to the confining region, the second guard region being on a side of the confining region opposite the first guard region.

In another embodiment, disclosed in a method for generating a single electron qubit device. The method includes providing a plurality of qubit elements to a confining region, the confining region being adjacent to a substrate configured to support solid neon thereon. Applying, by a trapping electrode, a confining electric field to the confining region to trap one or more of the plurality of qubit elements in the confining region. A first set of guard electrodes applies a first guard electric field to a first guard region, the first guard electric field having an opposite sign than the confining electric field and the first guard region adjacent to the confining region. A second set of guard electrodes applies a second guard electric field to a second guard region, the second guard electric field having a same sign as the first guard electric field. The method further includes increasing the magnitude of the second guard electric field until a single qubit element is disposed in the confining region.

DETAILED DESCRIPTION

Figure 1:
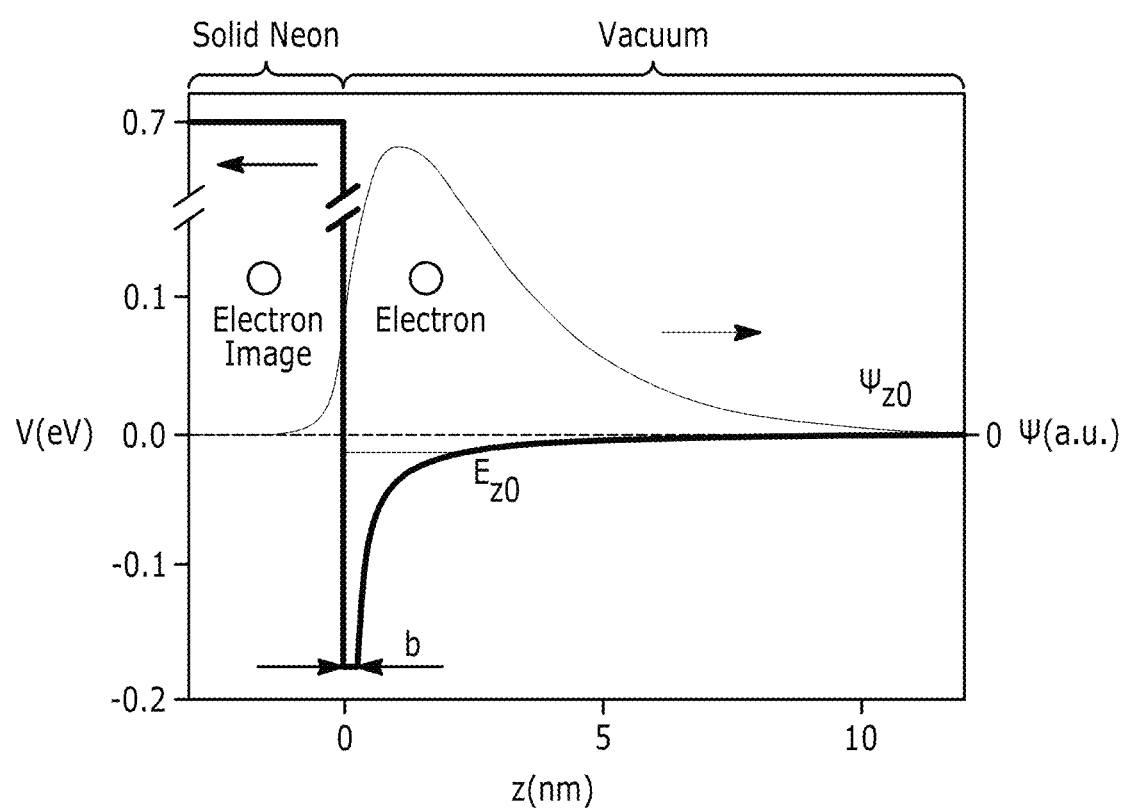
FIG. 1 is a plot of electric trapping potential for an electron as it approaches a solid Ne surface from vacuum.

Quantum computing requires quantum bit (qubit) platforms and devices with long coherence times, fast operation, and large scalability. Current qubit devices may have one or two of these requirements, but none exist having all three. Qubits may implement atoms, molecules, or subatomic particles as quantum information carriers for performing quantum processing operations. Among the various quantum information carriers, isolated single electrons allow for efficient manipulation and remote entanglement via interactions with photons through circuit quantum electrodynamics (cQED). Currently, electron based qubits are typically made using semiconductor heterojunctions and semiconductor-oxide interfaces. Despite standardized device fabrication and convenient electrical control, semiconductor electron qubits have a limited coherent time due to material imperfections and/or background noise. The qubit device disclosed herein is a non-semiconductor based electron qubit device embedded in an ultraclean low-noise environment that exhibits longer coherence times than semiconductor qubit devices. In addition to long coherence times, the described qubit device provides fast operation and scalability, making it viable for development into a quantum computing architecture.

Electrons are elementary charged particles with nonzero spin and mass. The motional or spin states of electrons may be used for qubit operations, but the coherence time of an electron qubit depends on the material environment of the qubit device. Described herein is a qubit platform that utilizes isolated single electrons trapped on an ultraclean solid neon surface in vacuum. The described device integrates an electron trap in a cQED architecture, which achieves a strong coupling between motional states of a single electron and microwave photons in an on-chip superconducting resonator. The resultant qubit device exhibits long coherence times of greater than 200 ns, with fast operation of approximately 10 ns or less, and with the possibility of coherence times greater than 1 second. Further, the described device is readily scalable for integrating in current quantum computing architectures.

Neon (Ne) is a noble-gas element next to helium (He) in the periodic table. In contrast to He, which is a liquid superfluid at zero kelvin unless a large pressure of at least 25 bar is applied, Ne spontaneously turns into a face-centered-cubic (fcc) crystal after passing its triple point at the elevated temperature $T_t$=24.556 K and moderate pressure $P_t$=0.43 bar. At near-zero kelvin, solid Ne can form a free surface to vacuum, and serve as an ultraclean substrate with no uncontrollable impurities or electromagnetic noise. Previously devices attempt to use superfluid helium to hold quantum information carriers, typically, electrons. Superfluid helium is easier to wet and cover a trapping substrate or region, and it is easier to control the thickness of the helium as compared to solid neon. Superfluid helium is highly understood in terms of physical characteristics in cryogenic environments and electron mobility. Due to the ease of working with helium over neon, there is little information or data pertaining to solid neon at low temperatures and to electron mobility of solid neon. Any electron mobility data pertaining to solid neon reports that the mobility of solid neon is less than super fluid helium, resulting in another reason to prefer super fluid helium over neon for certain quantum processes. Further, neither growing an even layer of solid neon or monitoring the thickness of solid neon are trivial or very well understood processes. The quantum platform described herein uses solid neon for trapping of a single electron which does not require fast or efficient electron mobility. Additionally, a means for measuring the thickness of a solid neon layer is described allowing for the fabrication of thin smooth solid neon layers for forming qubit devices having longer coherence times than semiconductor charge qubit devices.

When an electron approaches a solid Ne surface from vacuum, two effects lead to an out-of-plane trapping potential that can bind the electron to the surface. FIG. 1 is a plot of electric trapping potential of an electron as it approaches a solid Ne surface from vacuum. A repulsive barrier of approximately 0.7 eV occurs at the surface of the solid Ne due to Pauli exclusion between the approaching electron and atomic shell electrons. An attractive polarization potential of $$V(z) = -\frac{\epsilon - 1}{\left[\frac{(\epsilon+1)e^2}{4z}\right]}, (z > b),$$

with a dielectric constant $\epsilon$=1.244 and short-range cutoff b≈2.3 Å, occurs due to an induced image charge inside the solid Ne. Due to the attractive potential, the electron's z-axis motion (i.e., toward and away from the solid neon) has a ground-state energy of $E_{z0}$=−15.8 meV and an eigen-wavefunction peak at about 1 nm from the surface, as shown in FIG. 1. The energy required to excite the electron to the first excited state is 12.7 meV which is equivalent to a 147 K activation temperature. Therefore, at a 10 mK temperature the electron is maintained in a ground-state subband of z-motion states.

Condensed liquid or solid noble-gas elements with positive (i.e., repulsive) electron affinity can hold electrons on a free surface in vacuum. Many other materials have negative electron affinity and contain charged contaminants or dangling bonds at surfaces that can capture and localize excess electrons rendering them useless for forming qubits. Further, the electron on solid Ne device described here provides much strong surface rigidity than other systems such as electron on liquid helium devices, allowing for the solid Ne qubit to suppress decoherence through surface excitations and other sources of noise. Therefore, materials such as solid Ne surface may be useful for generating strong electron trapping for long coherence time qubit devices.

Figure 2:
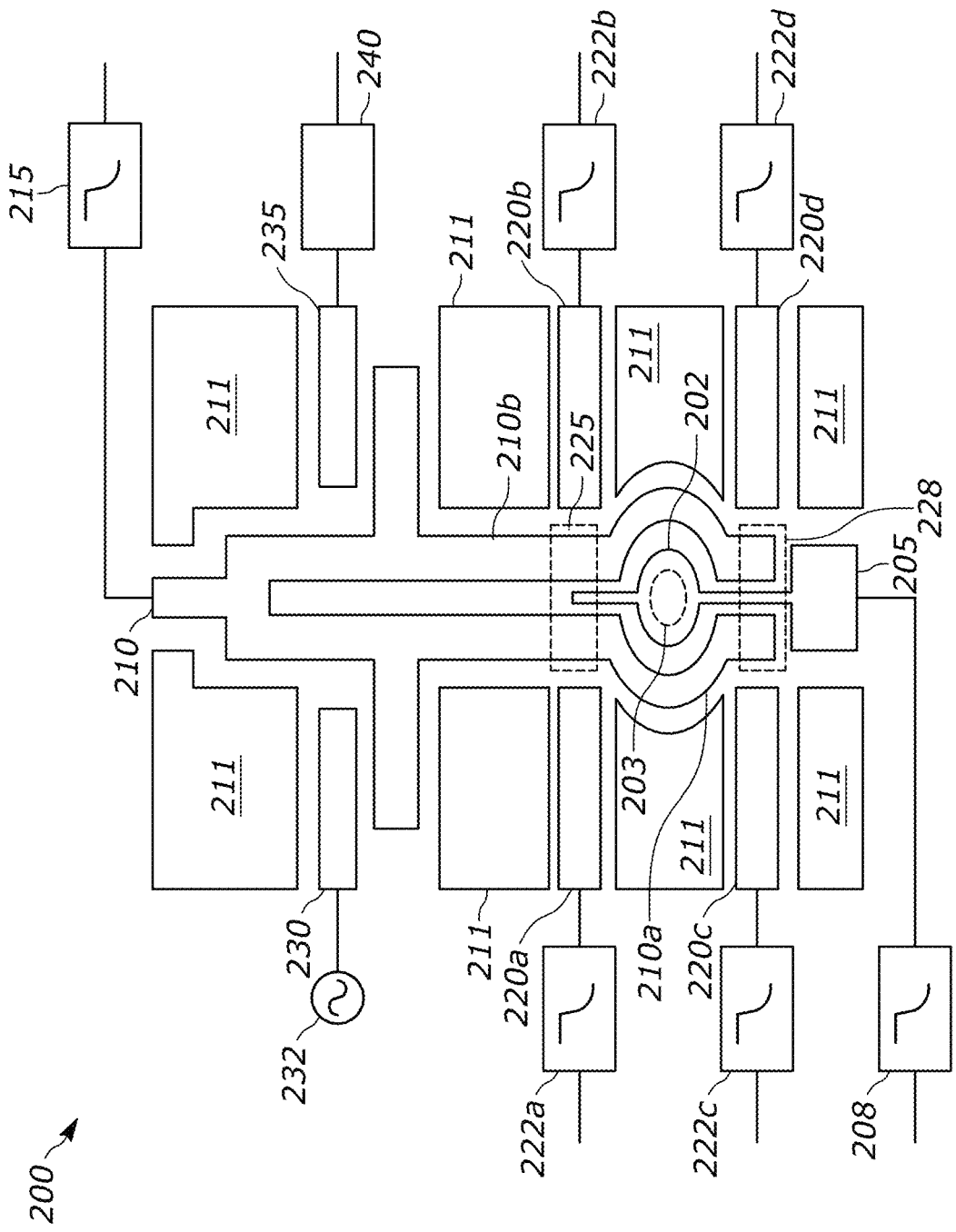
FIG. 2 is a schematic of a qubit platform for trapping a single electron and performing manipulation and readout of the electron.

FIG. 2 is a schematic of a qubit platform 200 according to embodiments described herein. The qubit platform 200 enables the generation and reading of a qubit by trapping a single electron in a region adjacent to solid Ne, and performing measurements of the state of the single electron via electrodes and a resonator. The qubit platform 200 includes a trap electrode 205, with the trap electrode having a trap region 202 against which an electron may be trapped and used as a quantum information carrier. Quantum information carriers, such as electrons, may further be referred to herein as qubit elements. The trap region 202 may be solid Ne or another solid material for trapping the electron. While described herein as an electron, another quantum information carrier may be trapped against the trap region 202. Other quantum information carriers may include ions, neutral atoms, and molecules. The trap region 202 is illustrated as an elliptical flat surface for trapping the electron against. In examples, the trap region 202 may be a circular, square, rectangular, or other shaped flat surface. Further, the trap region 202 may be a concave or convex surface for trapping an electron. The shape and size of the trap region 202 may depend on the type of quantum information carrier, and the three dimensional geometries and strength of a trapping electric field, discussed further herein.

A trap voltage source 208 is electrically coupled to the trap electrode 205, and the trap voltage source 208 provides a tunable voltage to the trap electrode 205. When a voltage is applied to the trap electrode 205, and therefore applied to the trap region 202 of the trap electrode 205, a trapping electric field is generated in a region of space, referred to herein as a confining region 203, adjacent to the flat surface of the trap region 202. In the illustration of FIG. 2, the confining region 203 may be adjacent to the flat trap region 202 in a direction out of the plane of the page. The trapping electric field may be tuned to trap one or more electrons or quantum information carriers in the confining region 203.

A resonator 210 is disposed adjacent to the trap region 202, with the resonator 210 configured to provide both DC and microwave electrical coupling to the confining region 203 for manipulating and probing of a quantum information carrier confined in the confining region 203. The resonator 210 may be a quarter-wave double-line microwave resonator having a first strip 210a and a second strip 210b, with the first and second strips 210a and 210b being disposed on opposites sides of the trap region 202. In examples, the resonator 210 may be a half wave resonator having two open ends or another two line or two strip resonator. Further, the resonator 210 may be a single line or single strip resonator. A resonator voltage source 215 is electrically coupled to the resonator 210 to provide tunable voltages to the resonator 210.

A first guard electrode 220a is disposed adjacent to the first strip 210a, and a second guard electrode 220b is disposed adjacent to the second strip 210b of the resonator 210. First and second guard voltage sources 222a and 222b are respectively electrically coupled to the first and second guard electrodes 220a and 220b to provide variable voltages to the first and second guard electrodes 220a and 220b. When a voltage is applied to the first and second guard electrodes 220a and 220b, the first and second guard electrodes 220a and 220b generate a first guard electric field to a guard region 225. The first guard region 225 is a region of space between the first and second guard electrodes 220a and 220b, adjacent to one side of the trap region 203. The first guard electric field is used to trap a single electron in the confining region 203, as described further herein with respect to FIG. 3. Together, the first and second guard electrodes 220a and 220b may be referred to as a first set of guard electrodes 220a and 220b.

A third guard electrode 220c and a fourth guard electrode 220d are disposed adjacent to the first strip 210a and second strip 210b, respectively. Third and fourth guard voltage sources 222c and 222d are, respectively, electrically coupled to the third and fourth guard electrodes 220c and 220d to provide variable voltages to the third and fourth guard electrodes 220c and 220d. When a voltage is applied to the third and fourth guard electrodes 220c and 220d, a second guard electric field is generated in a second guard region 228 between the third and fourth guard electrodes 220c and 220d. The second guard region 228 is a region of space adjacent to the trap region 202 on a side of the trap region 202 opposite that of the first guard region 225. The second guard electric field is used to trap a single electron in the confining region 203 further discussed herein. The qubit platform 200 further includes electrical grounds 211, disposed between various electrical conductive elements of the qubit platform 200 for properly forming the various electrical fields required for trapping and manipulating a quantum information carrier in the confining region 203. The illustrated positions and shapes of the grounds 211 is one only one possible configuration, the qubit platform 200 may include less grounds, or more electrical grounds disposed at different positions as required for grounding electrical signals, or forming geometries of electrical fields.

FIG. 2 illustrates one embodiment of the positions of the guard electrodes 220a, 220b, 220c, and 220d, and the first and second guard region 225, 228. Other implementations are envisioned including a qubit device having more than four guard electrodes, fewer than four guard electrodes, and different positions and geometries of the electrodes. For example, guard electrodes may be disposed underneath of the trap region 202, underneath of the resonator 210, and/or directly adjacent to the sides of the trap region 202. These examples are for illustrative purposes, other configurations of electrodes are envisioned.

A probe electrode 230 is disposed adjacent to the first strip 210a, and a probe source 232 is electrically coupled to the probe electrode 230. The probe source 232 provides a voltage to the probe electrode 230 which further provides a potential to the resonator 210 via the first strip 210a. The resonator 210 then provides a microwave probe electric field to an electron trapped in the confining region 203 to probe a state of the electron. In examples, the probe source 232 may be a microwave source. The probe source 232 may provide microwaves having a frequency in the range of 4 to 12 GHz, 1 to 10 GHz, 1 to 20 GHz, 1 to 50 GHz, or another frequency, or range of frequencies in the microwave region. Using microwaves for manipulating and performing readout of the electron allow for the described qubit platform 200 to be integrated into many current systems as compared to other semiconductor qubit devices that typically require specific radiation sources and bulky laboratory equipment. Coupling of the probe electrode 230 to the resonator 210 allows for probe signals to be delivered from the probe source 232 to the electron trapped in the confining region 203, which removes the need for spatially tuned and focused laser for manipulating the electron simplifying system complexity and allowing for scalability.

The two strips of the resonator 210 are disposed to couple the resonator 210 to the electron and thus couple the resonator to the state of the electron. The resonator 210 may then manipulate the state of the electron, and the resonator 210 may receive electrical signals indicative of a state of the electron. A sensing electrode 235 is disposed adjacent to the second strip 210b, with the sensing electrode 235 configured to inductively receive electrical signals indicative of the states of the electron from the resonator 210. The sensing electrode 235 is electrically coupled to a processor 240, or other system, for storing and/or processing the electrical signal. Together, the probe electrode 230 and sensing electrode 235 provide a means for determining a state of the electron trapped in the confining region 203 for performing qubit read operations. Further, the probe electrode and the sensing electrode may perform qubit write operations to manipulate a state of the electron.

Figure 3:
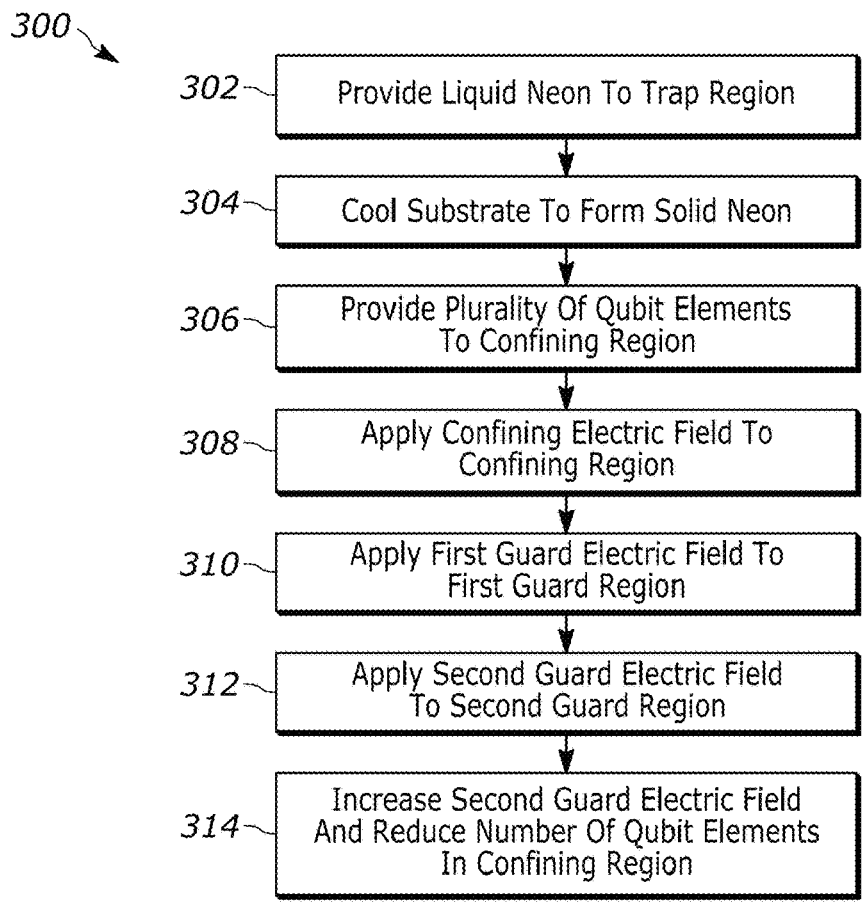
FIG. 3 is a flow diagram of a method for using the qubit apparatus of FIG. 2 to trap a single electron in a confining region of space.

FIG. 3 is a flow diagram of a method 300 for using the qubit platform 200 to trap a single electron in the confining region 203 adjacent to the trap region 202. The method 300 will be described with simultaneous reference to FIG. 2. As previously described, the trap region 202 may include a solid material for forming a layer of solid Ne thereon. As such, the method 300 includes providing liquid Ne to the trap region 202 (block 302). In examples, the method may include providing another liquid or vapor of an inert element to the trap region 202. A cryostat, such as a dilution refrigerator or another cooling device, cools the qubit platform 200, and specifically cools the trap region 202, and the liquid Ne disposed thereon, to cause the liquid Ne to phase change to solid Ne on the trap region 202 (block 304). The cryostat cools the qubit platform to less than 24.5 K to form the solid neon, and to less than 30 mK to perform qubit operations. The cryostat may cool the qubit platform to 10 mK or less. The solid Ne may be a monolayer of solid Ne or a layer of solid Ne less than 15 nanometers thick. The layer of solid Ne may be any thickness for trapping an electron against the solid Ne using electric fields as described herein.

Quantum information carriers, in the form of charge carriers (e.g., electrons) are provided to the qubit platform 200, and specifically to the confining region 203 (block 306). Charge carriers may be provided by heating of a tungsten filament to provide electrons to the confining region 203 through ejection of the electrons from the tungsten. Charge carriers may be provided by thermionic emission from another material such as a tungsten filament or carbon nanotube, by field emission, or by another means.

The trapping electrode source 208 provides a voltage to the trapping electrode 205, and further to the trap region 202 to generate to the confining electric field in the confining region 203 (block 308). In the current example with an electron as the quantum information carrier, the trapping electrode provides a positive voltage to attract the electrons to the trap. The plurality of electrons in the confining region are then trapped in the confining region 203 adjacent to the solid Ne. The first set of guard electrodes 220a and 220b then provide the first guard electric field to the first guard region 225 (block 310). The first and second guard sources 222a and 222b provide a negative voltage to the first and second guard electrodes 220a and 220b to generate a repulsive force to electrons in the first guard region 225. The repelling of electrons from the first guard region 225 ensures that no electrons are present in regions adjacent to the trap region 202, by pushing electrons out of the first guard region 225. The second set of guard electrodes 220c and 220d provide the second guard electric field to the second guard region 228 (block 312). The third and fourth guard sources 222c and 222d provide a negative voltage to the third and fourth guard electrodes 220c and 220d to generate a repulsive force to electrons in the second guard region 228 removing electrons from the second guard region 228. Therefore, only electrons in the confining region 203 are trapped after the first and second set of guard electric fields are applied.

The third and fourth guard sources 222c and 222d then increase (i.e., decrease in negative magnitude) the voltage applied across the third and fourth guard electrodes 220c and 220d to reduce the number of electrons trapped in the confining region 225 (block 314). Increasing the voltage across the second set of guard electrodes 220c and 220d causes the trapping electric field to loosen in the confining region reducing the number of electrons being trapped in the confining region 225. The voltage across the second set of guard electrodes 220c and 220d is increased until a single electron is trapped in the confining region 225. After the single electron is trapped in the confining region 225, the qubit platform 200 is ready for performing quantum information processes through manipulating and reading of states of the electron.

While the electric fields provided by the trapping and guard electrodes 205 and 220a-220d are used to trap a single electron in the confining region 203, the fields also constrain the motion of the single electron in the confining region 203. By tuning the trapping and guard voltages the motional states of the electron can be constrained to specific motion states such as a ground and first excited state of the electron. Therefore, the accessible states of the qubit platform 200 may be controlled by the voltages applied to the trapping and guard electrodes 205 and 220a-220d. The electrode arrangement illustrated in FIG. 2 allows for a qubit that maintains an electron in an x-motion ground state, and provides availability to both a ground and first excited y-motion state. Other arrangements of electrodes and trapping/guard electric fields may provide a qubit device that allows access to a plurality of excited states in either or both the x- and y-motion states, as well as arrangements may confine either the x- or y-motion states to a ground state. In the embodiments of FIG. 2, the z-motion states are confined to the ground state as the electron is trapped in the z-direction (e.g., in and out of the plane of the page) against the trap region 202.

While not explicitly illustrated, it should be understood that the qubit platform 200 of FIG. 2 may include other elements for performing manipulation and reading of states of the electron. For example, the sensing electrode 235 may be electrically coupled to an amplifier and/or filters to amplify and filter the electrical signal indicative of the state of the electron. Further, each of the trap electrode 205, probe electrode 230, guard electrodes 220a-220d, sensing electrode 235, and resonator 210 may be electrically coupled to one or more preamplifiers, amplifiers, highpass filters, low-pass filters, bandpass filters, notch filters, integrated circuits, or other electrical components. Further, the qubit platform 200 may include one or more electrical grounds as required to generate the first and second guard electrical fields, and the trap electric field.

Figure 4:
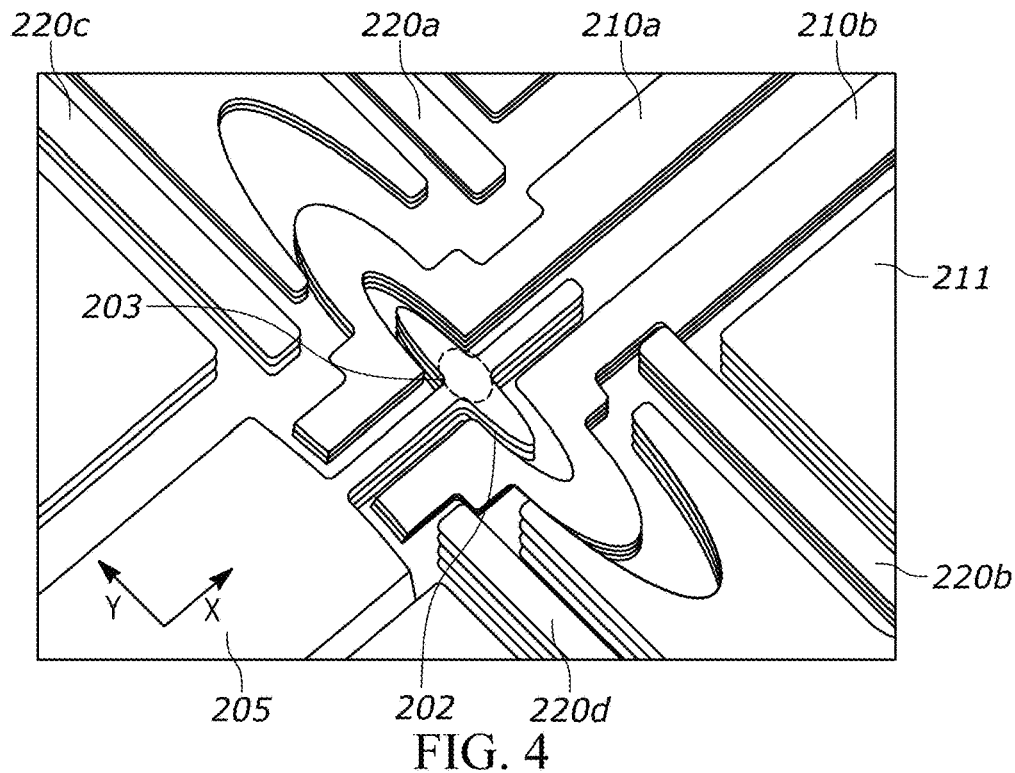
FIG. 4 presents a scanning electron microscopy image (SEM) image of a fabricated example of the qubit platform of FIG. 2.

A qubit device was fabricated according to the diagram of the qubit platform 200 of FIG. 2 and various experiments and measurements were performed to determine the functionality of the resulting qubit device. FIG. 4 presents a scanning electron microscopy image (SEM) image of the fabricated qubit platform 200. Each of the electrodes and grounds were made of superconducting niobium deposited on a high-resistivity silicon substrate. The trap electrode 205 and the strips 210a and 210b of the resonator 210 were disposed in a 4 mm long channel between the guard electrodes 220a-220d. Each of the guard electrodes 220a-220d was electrically coupled to a low-pass filter to isolate electrons along the strips 210a and 210b or trapped in the confining region 203, from noise generated by the guard sources 222a-222d. Isolating the trapped electron increases the coherence time of the qubit device, and the overall amount of time the electron can be trapped in the confining region 203. The fabricated qubit device exhibited electron trap times of greater than 2 months, which is longer than other types of charge qubit devices.

Figure 5:
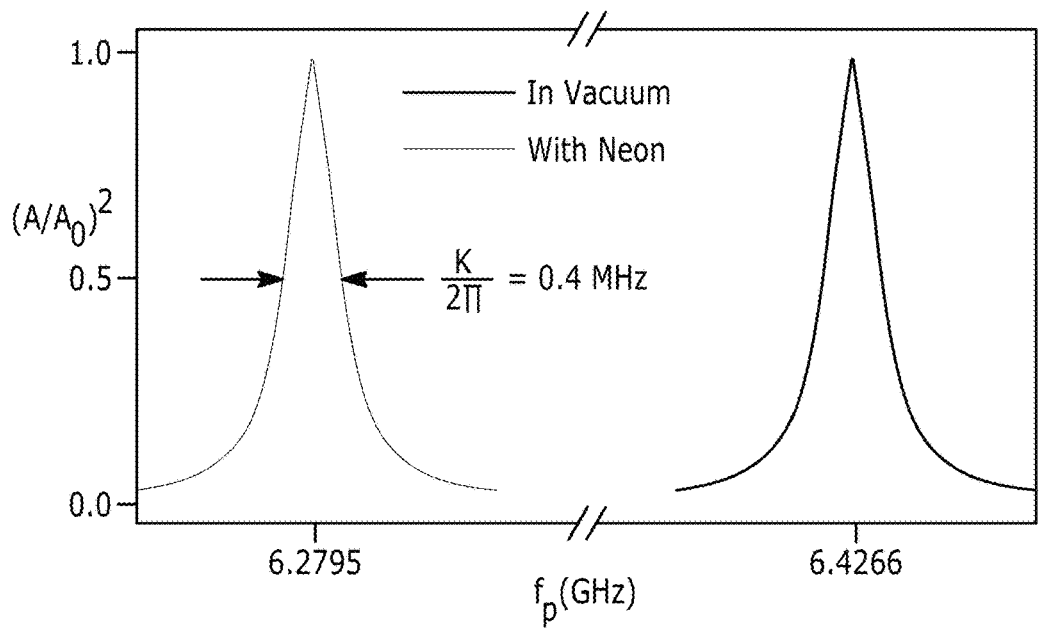
FIG. 5 is a plot of resonance frequency vs normalized amplitude of an applied electric field for a resonator having different thicknesses of solid neon deposited on a trap region of a trap electrode.

To generate the solid Ne layer on the trap region 202, liquid Ne was provided to the trap region 202 and the trap region 202 and surrounding environment was cooled to 10 mK to cause the liquid Ne to form a solid layer on the trap region 202. The thickness of the solid Ne layer was monitored by observing a frequency shift of the resonant frequency of the resonator. To observe the frequency shift of the resonator, the probe electrode 230 provided microwave signals at various frequencies to the resonator, and the transmission of the microwave signals were measured at the sensing electrode 235. FIG. 5 is a plot of resonance frequency vs normalized amplitude of an applied electric field for the resonator having different thicknesses of solid Ne deposited on the trap region 202. The resonance frequency of the resonator was 6.4266 GHz with no Ne deposited, and 6.2795 GHz with solid Ne deposited on the trap region. The frequency shift of ~147 MHz is indicative of a solid neon layer thickness of ~1 µm. A frequency shift of 0.3-0.6 MHz indicates a solid Ne layer thickness of between 5-10 nm. As shown by FIG. 5, the linewidth of the resonator was measured as 0.4 MHz, which was independent of the presence of the solid Ne. The linewidth of 0.4 MHz indicates that the qubit device has a quality factor of $Q \approx 1.6 \times 10^4$. A quality factor on the order of $10^3$ or $10^4$ is necessary for achieving the strong coupling regime. The strong coupling regime allows for manipulation and readout of a qubit over lengths of time that preserve the quantum information and quantum characteristics of the qubit.

Figure 6:
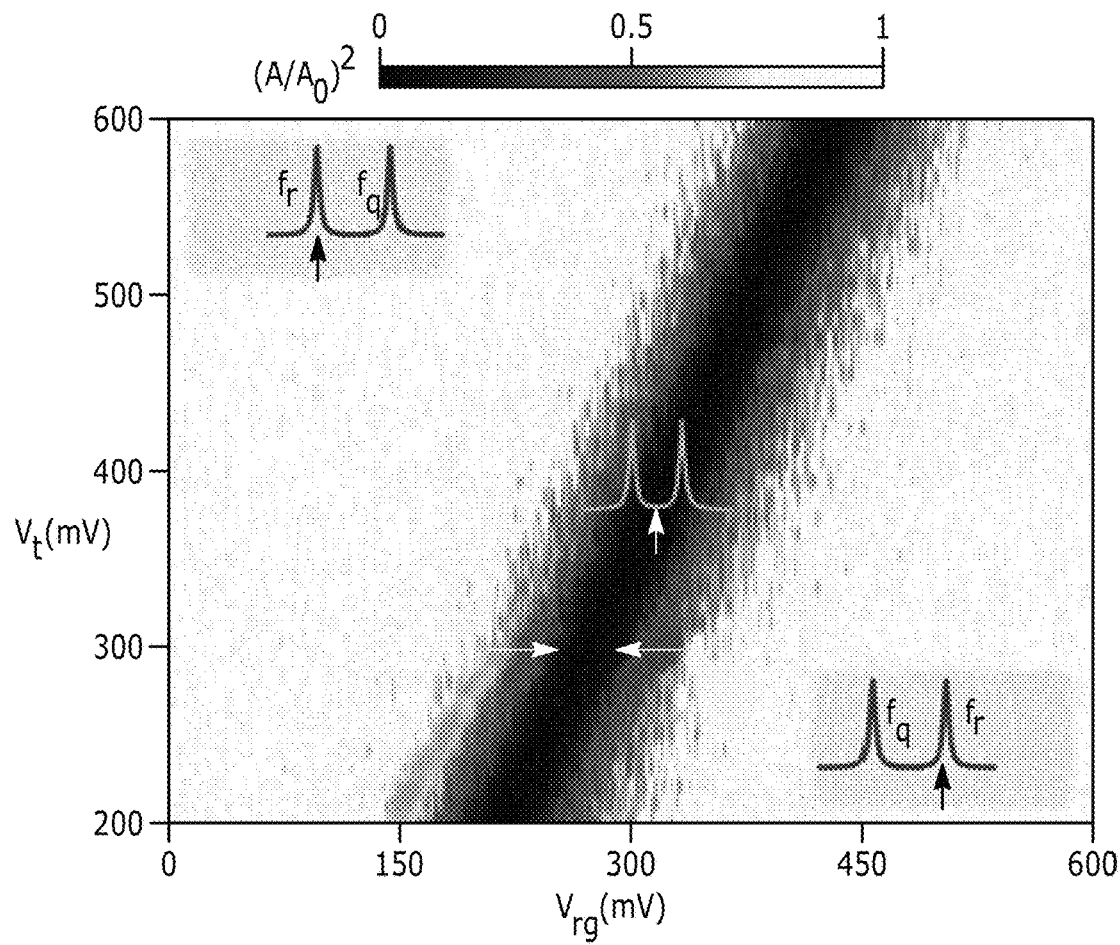
FIG. 6 is a plot of normalized microwave transmission amplitude of a resonator versus a trap voltage and a voltage applied by a first set of guard electrodes.

An electron was loaded on the trap region 202 and trapped in the confining region 203 against the solid Ne. The resonator source 215 provided a fixed DC voltage of 1 V to the resonator 210, and the voltage between the second set of guard electrodes 222c and 222d was set to 0 V. The confining voltage and the first guard voltage were tuned to shift the electron transition frequency of the trapped electron to the frequency of the resonator 210. FIG. 6 is a plot of normalized microwave transmission amplitude of the resonator versus the trap and first guard voltages $V_t$ and $V_{rg}$. The amplitude of the microwave transmission decreases to near 0 when the electron transition frequency is tuned to the frequency of the resonator, as shown by the diagonal region through the central region of FIG. 6.

Figure 7:
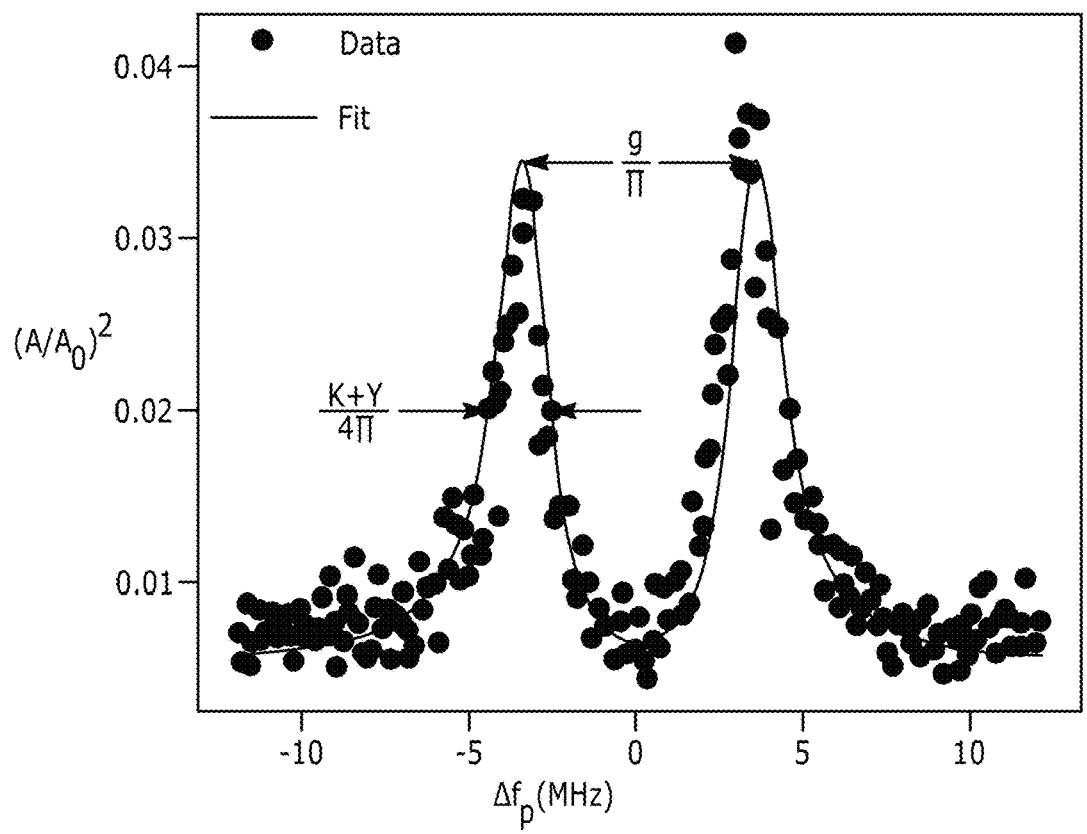
FIG. 7 is a plot of normalized microwave transmission amplitude of a resonator under different probe frequencies.

FIG. 7 is a plot of normalized microwave transmission of the resonator under different probe frequencies as applied by the probe electrode 230. The transmission spectrum of FIG. 7 was measured with the electron transition frequency tuned to the resonator frequency. The two peaks of FIG. 7 show the Rabi splitting of the electron-resonator coupled system around the bare resonator frequency. Using a fit over the two peaks results in a calculated coupling strength of $$\frac{g}{2\pi} = 3.5 \text{ MHz},$$

a dephasing of $\gamma/2\pi \approx 1.7$ MHz, and with a resonator decay rate of $\kappa/2\pi \approx 0.4$ MHz. Using the relationship g>γ, κ with g being a factor of 2 greater than either γ or κ indicates that the qubit has entered the strong coupling regime enabling coherent microwave control and readout of the single-electron qubit in the qubit platform 200.

Figure 8:
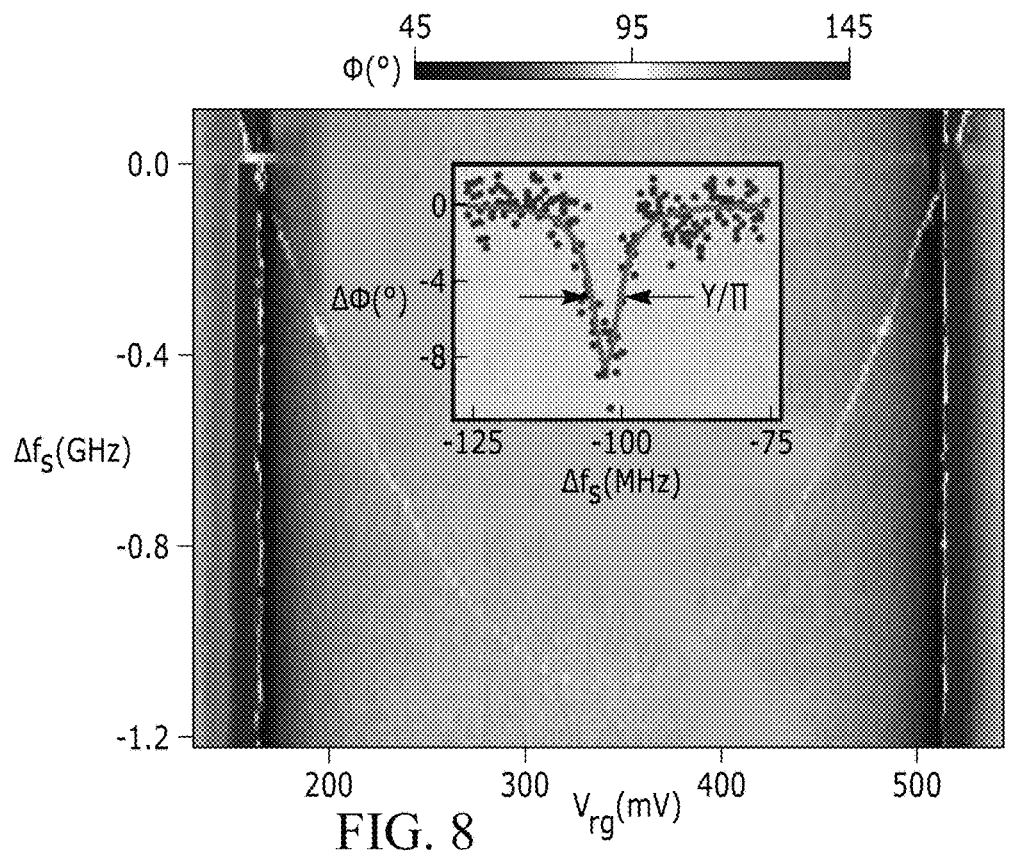
FIG. 8 is a plot of transmission phase offset of resonator frequency over a band of detuned qubit pump frequencies.

Spectroscopy and time-domain characterizations were performed for the qubit platform 200 with an electron as the qubit element. The first guard electric field was tuned to shift the qubit frequency and detune the qubit frequency around the resonator frequency. At each detuning of the qubit frequency, the transmission amplitude and transmission phase of the resonator frequency was measured by applying an electrical signal at the resonator frequency, and measuring the transmission at the sensing electrode 235. FIG. 8 is a plot of the transmission phase offset of the resonator frequency for different detuned probe frequencies. The probe tone is swept over 1 GHz around the resonator frequency and the phase of the resonator frequency is measured. When the probe frequency approaches the qubit frequency the qubit is excited, or partially excited, into an excited state causing a dip or peak in the phase offset of the resonator frequency, as shown in the inset of FIG. 8. The transmission phase spectrum presented in FIG. 8 was obtained by scanning across a band of probe frequencies at different applied offsets of the qubit transmission frequency. Applying a Lorentzian fit to the spectrum presented in FIG. 8 resulted in a measured qubit transition frequency linewidth of $$\frac{\gamma}{2\pi} = 2.8 \text{ MHz}.$$

The 2.8 MHz linewidth is narrower than the coupling strength of 3.5 MHz indicating that the system is in the strong-coupling regime. The strong-coupling regime allows for the use of single microwave photons for tuning the electron qubit states. Single photons are able to be used due to the qubit transition speeds being faster than the system would lose the quantum information.

Figure 9:
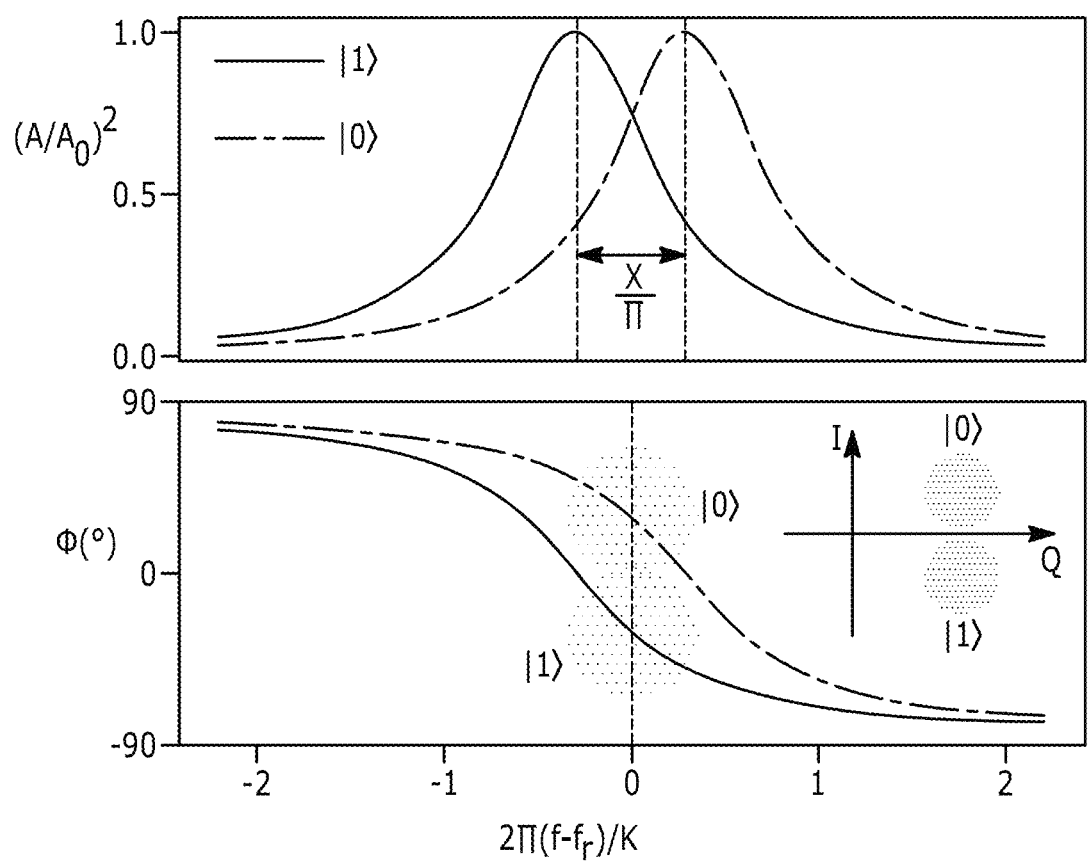
FIG. 9 presents plots of normalized resonator transmission amplitude and phase for different probe frequency for both a qubit in the ground state and a qubit in the first excited state.

The states of the electron were observed through blue and red frequency shifts of the resonator frequency. FIG. 9 presents plots of normalized resonator transmission amplitude and phase for different frequency offsets around the resonator frequency, for both a qubit in the ground state, and a qubit in the first excited state. The plots of FIG. 9 show that, when the qubit frequency is tuned below the resonator frequency, the qubit excited state red shifts the resonator frequency while the qubit ground state causes a blue shift of the resonator frequency. Further, the excited and ground state qubit systems result in a phase different of approximately 30° at the center resonator frequency between the two shifted frequency peaks. The qubit dependent frequency shift of the resonator 210 was determined to be $$\frac{\chi}{2\pi} = 0.12 \text{ MHz},$$

which allows for fast charge qubit operation compared to other charge qubit systems. The transitions between the ground and excited state were measured and a qubit gate duration of ≈12 ns was measured. Decreasing the gate duration allows for more operations to be performed on a qubit within the relaxation and coherence times of the qubit.

Figure 10:
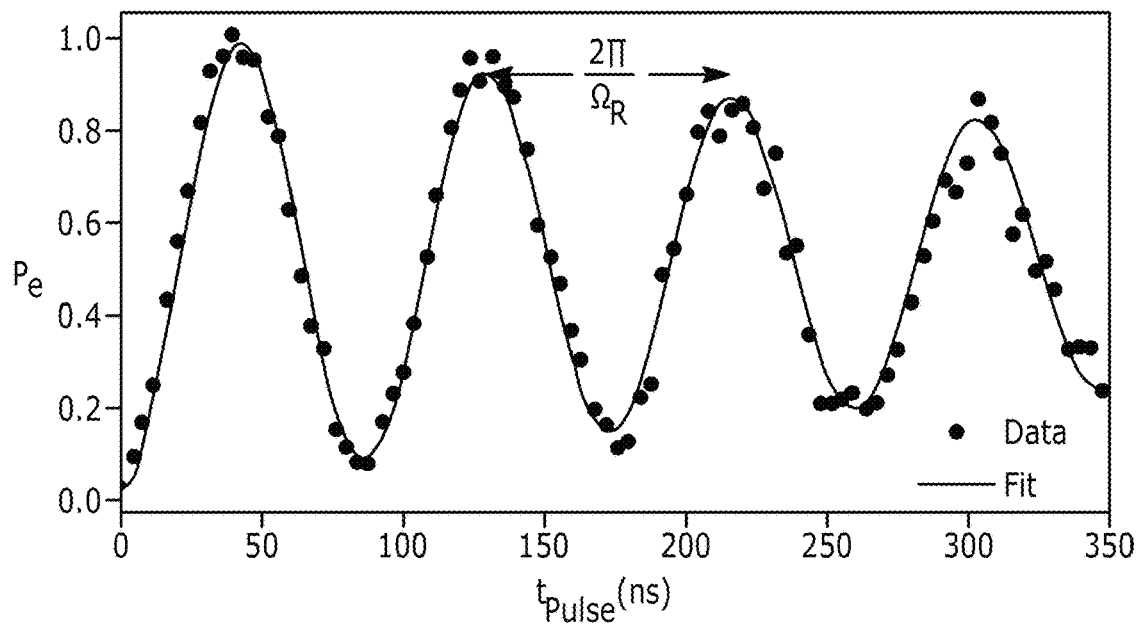
FIG. 10 is a plot of excited-state population versus time showing Rabi oscillations of a fabricated qubit device.
Figure 11:
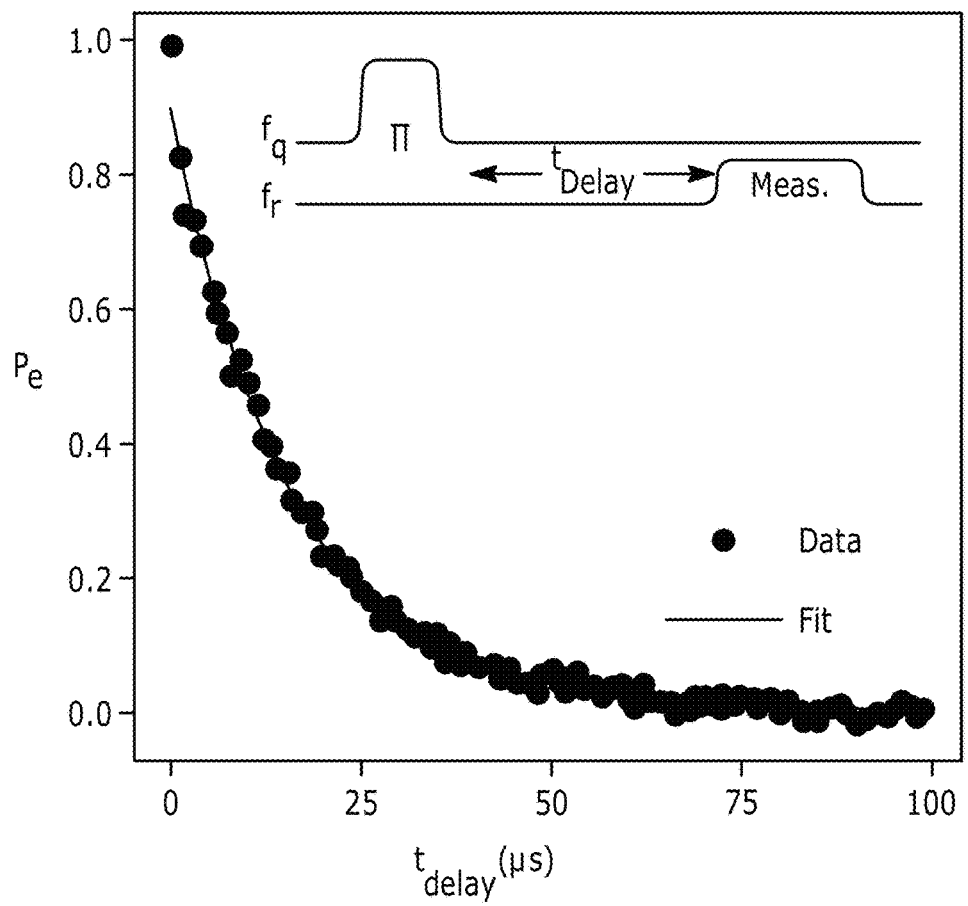
FIG. 11 is a plot of excited-state population versus measurement delay between excitation of a qubit and measurement of the qubit state.

FIG. 10 is a plot of excited-state population $P_e$ versus time showing Rabi oscillations of the fabricated qubit device. The data of FIG. 10 was collected by applying pulses at the qubit frequency with variable durations from the probe electrode 230 to the electron trapped in the confining region 203. The $T_1$ relaxation time was measured using a π-pulse and performing a readout measurement at different time delays after applying the π-pulse. The amount of time for which the Rabi oscillation takes to reach a first peak is the length of time for the π-pulse for performing a "write" operation on the qubit. FIG. 11 is a plot of excited-state population versus measurement delay between when the qubit was excited and when the qubit state was measured. The exponential fit of the data of FIG. 11 indicates a $T_1$ relaxation time of 15 μs which is longer than most current semiconductor based qubits, which have relaxation times typically less than 10 μs.

Figure 12:
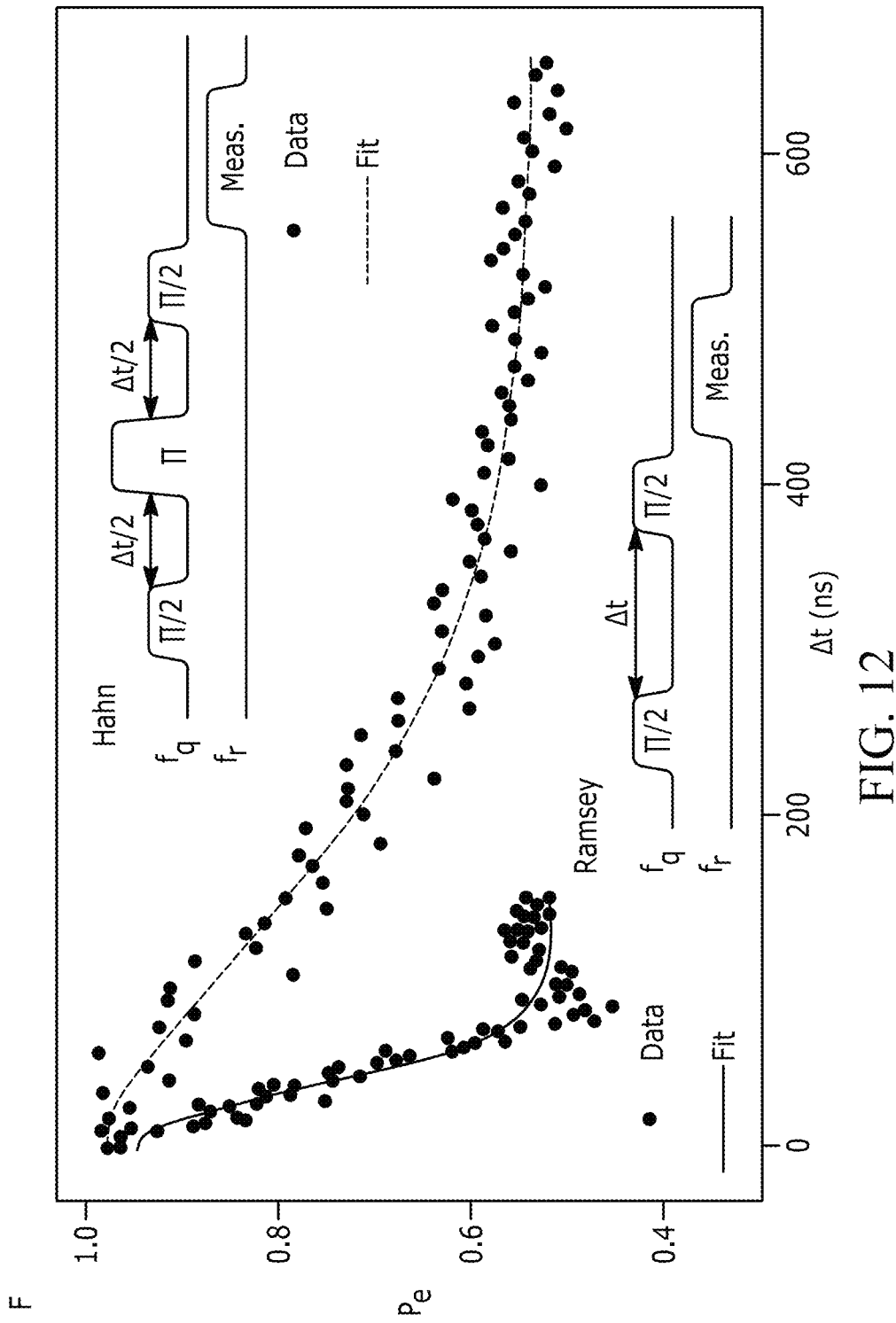
FIG. 12 is a plot of excited-state population versus time delay for original coherence time and extended coherence time measurements.

FIG. 12 is a plot of excited-state population versus time delay for an original coherence time $T_2^*$, and extended coherence time $T_{2E}$ measurements. The original coherence time measurement was performed by observing Ramsey fringes of the electron by applying π/2 pulses with varied time delays between the applied pulses, as shown by the lower inset of FIG. 12. The extended coherence time measurement was performed by observing Hahn echoes of the electron by applying alternating π and π/2 pulses with varied time delays between the applied pulses, as shown in the upper inset of FIG. 12. The fit of the original coherence time measurement indicates a $T_2^*$ coherence time of 50 ns, which is consistent with the expected coherence time inferred from the spectroscopy data presented in FIG. 8 (i.e., $$\frac{\gamma}{2\pi} \text{ of 2.8 MHz.})$$

The extended coherence time measurement yielded a $T_{2E}$ of 220 ns, which is longer than current semiconductor charge qubit systems.

The presented single electron qubit devices provide long coherence and relaxation times while allowing for fast operation of the qubit, as compared to other qubit technologies. Further, the fabrication of the disclosed qubit platforms allows for scalability and implementation into current quantum computing systems. The use of solid Ne on a trapping substrate provides low noise resulting in the long coherence of the qubit which is one clear advantage over other qubit devices.

The following list of aspects reflects a variety of the embodiments explicitly contemplated by the present disclosure. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A device comprising: a trap electrode having a trap region configured to structurally support solid neon disposed thereon, the trap electrode configured to provide a confining electric field to a confining region adjacent to the trap region; a first set of guard electrodes configured to provide a variable electric potential to a first guard region adjacent to the confining region on one side of the confining region; and a second set of guard electrodes configured to provide a variable electric potential to a second guard region adjacent to the confining region, the second guard region being on a side of the confining region opposite the first guard region.
2. A device according to aspect 1, further comprising: a probe electrode disposed adjacent to the trap region, the probe electrode configured to provide a probe electric field to the confining region; and a sensing electrode disposed adjacent to the trap region, the sensing electrode configured to receive an electrical signal from the confining region.
3. A device according to aspect 1, further comprising a resonator disposed adjacent to the trap region, the resonator configured to provide electric fields to the confining region, and to receive electric fields from the confining region.
4. A device according to aspect 3, further comprising: a probe electrode disposed adjacent to the resonator, the probe electrode configured to provide a probe electric field to the confining region through the resonator; and a sensing electrode disposed adjacent to the resonator, the sensing electrode configured to receive an electrical signal from the confining region through the resonator.
5. A device according to aspect 3, wherein the resonator comprises a microwave resonator.
6. A device according to aspect 3, wherein the resonator comprises a double strip-line resonator.
7. A device according to either of aspects 2 or 4 wherein the probe electrode comprises a microwave source.
8. A device according to any of aspects 1 to 7, further comprising a quantum bit element disposed in the confining region, the quantum bit element being confined to the confining region by the confining electric field.
9. A device according to aspect 8, wherein the quantum bit element comprises an electron.
10. A device according to aspect 9, further comprising a resonator configured to electrically coupled with the quantum bit element confined in the confining region.
11. A device according to any of aspects 1 to 12, further comprising solid neon disposed on the substrate.
12. A device according to aspect 11, wherein the solid neon is a monolayer of neon.
13. A device according to aspect 11, wherein the solid neon comprises a layer of neon less than 15 nanometers thick.
14. A device according to any of aspects 1 to 13, further comprising a cryocooler, wherein the trap region, trap electrode, first set of guard electrodes, and second set of guard electrodes are disposed inside of the cryocooler, and the cryocooler is configured to cool the trap region to less than 30 mK.
15. A method of trapping a qubit element using the device of aspect 1, the method comprising: providing a plurality of qubit elements to the confining region; applying, by the trapping electrode, the confining electric field; applying, by the first set of guard electrodes, a first guard electric field to the first guard region, the first guard electric field having an opposite sign than the confining electric field; and applying, by the second set of guard electrodes, a second guard electric field to the second guard region, the second guard electric field having a same sign as the first guard electric field, and increasing the magnitude of the second guard electric field until a single qubit element is disposed in the confining region.
16. A method according to aspect 16, further comprising: providing, before providing the plurality of qubit elements to the confining region, liquid neon to the substrate; and cooling the substrate to a temperature of less than 30 mK.
17. A method of trapping a quantum information carrier on solid neon, the method comprising: providing a plurality of qubit elements to a solid neon region; applying, by a trapping electrode, a confining electric field to a confining region, the confining region being adjacent to the solid neon region; applying, by a first set of guard electrodes, a first guard electric field to a first guard region adjacent to the confining region on one side of the confining region, the first guard electric field having an opposite sign than the confining electric field; and applying, by a second set of guard electrodes, a second guard electric field to a second guard region adjacent to the confining region on a side of the confining region opposite the first guard region, the second guard electric field having a same sign as the first guard electric field, and increasing the magnitude of the second guard electric field until a single qubit element is disposed in the confining region.
18. The method of aspect 17, wherein the quantum information carrier comprises an electron.

What is claimed is:
1. A device comprising:
a trap electrode having a trap region configured to structurally support solid neon disposed thereon, the trap electrode configured to provide a confining electrical field to a confining region adjacent to the trap region;
a first set of guard electrodes configured to provide a variable electric potential to a first guard region adjacent to the confining region on one side of the confining region; and
a second set of guard electrodes configured to provide a variable electric potential to a second guard region adjacent to the confining region, the second guard region being on a side of the confining region opposite the first guard region.

2. The device of claim 1, further comprising:
- a probe electrode disposed adjacent to the trap region, the probe electrode configured to provide a probe electric field to the confining region; and
- a sensing electrode disposed adjacent to the trap region, the sensing electrode configured to receive an electrical signal from the confining region.

3. The device of claim 1, further comprising a resonator disposed adjacent to the trap region, the resonator configured to provide electric fields to the confining region, and to receive electric fields from the confining region.

4. The device of claim 3, further comprising:
- a probe electrode disposed adjacent to the resonator, the probe electrode configured to provide a probe electric field to the confining region through the resonator; and
- a sensing electrode disposed adjacent to the resonator, the sensing electrode configured to receive an electrical signal from the confining region through the resonator.

5. The device of claim 3, wherein the resonator comprises a microwave resonator.

6. The device of claim 3, wherein the resonator comprises a double strip-line resonator.

7. The device of claim 3, wherein the probe electrode comprises a microwave source.

8. The device of claim 1, further comprising a quantum bit element disposed in the confining region, the quantum bit element being confined to the confining region by the confining electric field.

9. The device of claim 8, wherein the quantum bit element comprises an electron.

10. The device of claim 8, further comprising a resonator configured to electrically couple with the quantum bit element confined to the confining region.

11. The device of claim 1, further comprising solid neon disposed on the trap region.

12. The device of claim 11, wherein the solid neon is a monolayer of neon.

13. The device of claim 11, wherein the solid neon comprises a layer of neon less than 15 nanometers thick.

14. The device of claim 1, further comprising a dilution refrigerator and wherein the trap electrode, first set of guard electrodes, and second set of guard electrodes are disposed inside of the dilution refrigerator, and the dilution refrigerator is configured to cool the trap electrode to below 30 mK.

15. A method of trapping a qubit element using the device of claim 1, the method comprising:
- providing a plurality of qubit elements to the confining region;
- applying, by the trapping electrode, the confining electric field;
- applying, by the first set of guard electrodes, a first guard electric field to the first guard region, the first guard electric field having an opposite sign than the confining electric field; and
- applying, by the second set of guard electrodes, a second guard electric field to the second guard region, the second guard electric field having a same sign as the first guard electric field, and increasing the magnitude of the second guard electric field until a single qubit element is disposed in the confining region.

16. The method of claim 15, further comprising:
- providing, before providing the plurality of qubit elements to the confining region, liquid neon to the trap region; and
- cooling the trap region to a temperature of less than 30 mK.

17. A method of trapping a quantum information carrier on solid neon, the method comprising:
- providing a plurality of qubit elements to a solid neon region;
- applying, by a trapping electrode, a confining electric field to a confining region, the confining region being adjacent to the solid neon region;
- applying, by a first set of guard electrodes, a first guard electric field to a first guard region adjacent to the confining region on one side of the confining region, the first guard electric field having an opposite sign than the confining electric field; and
- applying, by a second set of guard electrodes, a second guard electric field to a second guard region adjacent to the confining region on a side of the confining region opposite the first guard region, the second guard electric field having a same sign as the first guard electric field, and increasing the magnitude of the second guard electric field until a single qubit element is disposed in the confining region.

18. The method of claim 17, wherein the quantum information carrier comprises an electron.

* * * * *